(12) United States Patent
Sakata et al.

(10) Patent No.: US 6,170,516 B1
(45) Date of Patent: Jan. 9, 2001

(54) SOLENOID VALVE FIXING STRUCTURE

(75) Inventors: Akira Sakata; Tatsuya Matsumoto, both of Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/292,402

(22) Filed: Apr. 15, 1999

(30) Foreign Application Priority Data

Nov. 27, 1998 (JP) .................................................. 10-338183

(51) Int. Cl.⁷ ...................................................... F16L 3/00
(52) U.S. Cl. ...................... 137/343; 251/129.15; 285/360
(58) Field of Search ....................... 137/343; 251/129.15; 285/360

(56) References Cited

U.S. PATENT DOCUMENTS 4,298,020 * 11/1981 Inada et al. ............................ 137/315
4,330,004 * 5/1982 Yano et al. ............................ 137/343
4,842,010 * 6/1989 Edgecomb et al. ................... 137/343

FOREIGN PATENT DOCUMENTS 8-185654  7/1994 (JP).
10-118010 4/1998 (JP).

* cited by examiner

Primary Examiner—A. Michael Chambers
(74) Attorney, Agent, or Firm—Sughrue, Mion, Zinn, Macpeak & Seas, PLLC

(57) ABSTRACT

A solenoid valve fixing structure, which allows cheaply to improve the working performance of the fixing process and compactness of the fixing, without changing the design of the external form of the existing solenoid valve.

The solenoid valve fixing structure includes a recessing portion (6) disposed on an intake manifold (5), for receiving a solenoid valve (1), and a fixing member (4) having a fixing part (4a) to be fixed to the solenoid valve, a deformable lip (4d), which is an elongated portion of the fixing part to contact elastically with the recessing portion, and an insertion lip (4f), which is another elongated portion of the fixing part and is to be inserted into the recessing portion (6).

A solenoid valve (1) can be fixed to the intake manifold (5) strongly and promptly.

8 Claims, 18 Drawing Sheets

A-A (PRIOR.ART)

(PRIOR.ART)

SOLENOID VALVE FIXING STRUCTURE

BACKGROUND OF THE INVENTION

1. Field of the Invention

The present invention relates to a solenoid valve fixing structure for fixing a solenoid valve to an intake manifold.

2. Description of the Prior Art

A system for reserving hydro-carbon gas using an activated carbon canister is well known; in which a hydro-carbon gas evaporated from the fuel in a fuel tank, due to engine heat or external heat, is temporally reserved in an activated carbon containing canister, and while the vehicle is running, the reserved gas is sent into the intake manifold of the engine of a vehicle so as to be burned out, for protecting the emission of the hydro-carbon gas into the atmosphere.

An apparatus for suppressing evaporated fuel gas emission, which uses such a system for reserving hydro-carbon gas in an activated carbon containing canister, has usually a solenoid valve for opening and closing channels for the evaporated fuel gas and/or the air. A solenoid valve fixing structure in the prior art, which is arranged between a canister and an intake manifold, is explained below.

FIG. 25 is a schematic diagram of an apparatus for suppressing the evaporated fuel gas emission in the prior art. FIG. 26 is a plan view of a part of a fixing plate disposed at an intake manifold. FIG. 27 is a partially cross-sectional view of a solenoid valve fixing structure according to the prior art.

Reference numeral 21 denotes a fuel tank, the fuel tank is connected with a separator 23 through a channel 22. The evaporated gas from the fuel tank is separated into a liquid component and a gas component by the separator 23. Reference numeral 24 denotes a pressure sensor for diagnosis, which detects pressure change of the evaporated fuel gas, for detecting leakage of the evaporated fuel gas while the vehicle is running. Reference numeral 25 denotes an activated carbon containing canister for reserving the evaporated fuel gas temporally. The canister 25 has an air introducing hole 26, an evaporated fuel gas introducing hole 27 and an outlet hole 28 of the reserved fuel gas, which is lead to an intake manifold 29 of the engine.

The purge quantity of the evaporated fuel gas from the canister 25 to the intake manifold 29 is controlled by a solenoid valve 30. As shown in FIGS. 26 and 27, the solenoid valve 30 is fixed to a fixing plate 31, which projects from the intake manifold 29. A bolt 34 fixes the solenoids valve 30 to a fixing hole 32 disposed in the fixing plate 31. An insert bush 33 is disposed between the fixing plate 31 and the bolt 34.

An air cut valve 35 controls the opening and closing of a channel communicating with the air introducing hole 26 of the canister 25. Ordinarily, the air cut valve 35 keeps an opening state so that the air introducing hole 26 is open to the atmosphere. This air cut valve 35 is closed, only when the communication from the atmosphere shall be cut off, at diagnosis of the apparatus is made. The air cut valve 35 is connected to the air introducing hole 26 through a hose 36.

The mounting of the solenoid valve onto the intake manifold 29 is carried out as follows: An insert bush 33 is previously set into the fixing plate 31 of the intake manifold 29; A bolt 34 is inserted into the solenoid valve 30; The bolt 34 is screwed into the insert bush 33.

Due to such a structure, the solenoid valve fixing structure of the prior art has following drawbacks. First, a bolt 34 must be screwed into the insert bush 33. Therefore the fixing is not easy and it takes a long time. Second, the solenoid valve 30 cannot be fixed compactly, because the solenoid valve is fixed onto a fixing plate 31, jutting from the manifold 29.

Of course, the fixing using a bolt 34 can be made easy, by changing the design of the external form of a solenoid valve 30. However the change of a design entails to a high fabrication cost.

A box-formed solenoid valve installed on a manifold is disclosed in JP-A-6-185654, as another prior art. The solenoid valve described in it also requires a change of designing of its external form. Thus it entails to a high fabrication cost, too.

SUMMARY OF THE INVENTION

An object of the present invention is to eliminate these drawbacks of the prior art.

Another object is to propose a solenoid valve fixing structure, which is cheap in price and makes it possible to fix a solenoid valve to an intake manifold, without changing the external form of the existing solenoid valve.

Another object is to propose a solenoid valve fixing structure, in which a solenoid valve can be compactly received and can be fixed.

A solenoid valve fixing structure according to the present invention comprises a recessing portion and a fixing member having a fixing part, a deformable lip and an insertion lip. In this specification and Claims, the recessing portion is a portion of a member, where a recess is disposed for fixing a solenoid valve.

In an embodiment of the solenoid valve fixing structure of the present invention, the recessing portion has a first shoulder portion for defining the insertion position of the insertion lip and a second shoulder portion for defining the contacting position of the deformable lip.

In an embodiment of the solenoid valve fixing structure of the present invention, an engaging hole is disposed in the deformable lip, and an engaging claw is disposed in the recessing portion.

In an embodiment of the solenoid valve fixing structure of the present invention, a bolt clearance space is disposed in the recessing portion.

A solenoid valve fixing structure, as an embodiment of the present invention, comprises a recessing portion having a shoulder portion, a holding lip, and a fixing member having a fixing part, an insertion lip and an engaging claw.

DETAILED DESCRIPTION OF THE PREFERRED EMBODIMENT

Embodiment 1

The first embodiment of the present invention is explained below, referring to FIGS. 1–14.

At first, the structure of a solenoid valve fixing structure according to this embodiment is briefly explained.

Figure 1:
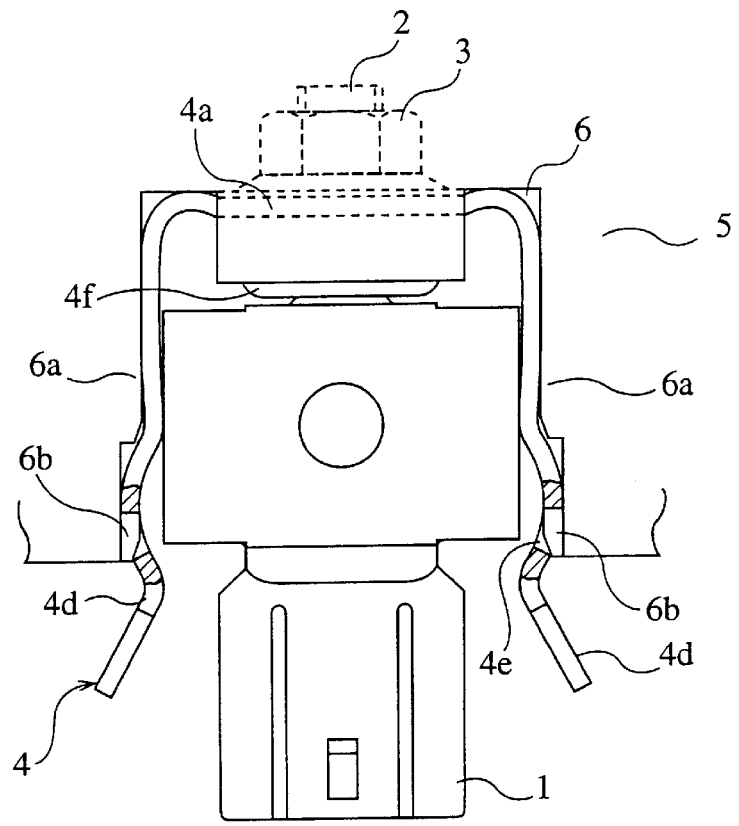
FIG. 1 is a plan view of a solenoid valve fixing structure according to the first embodiment of the present invention.
Figure 9:
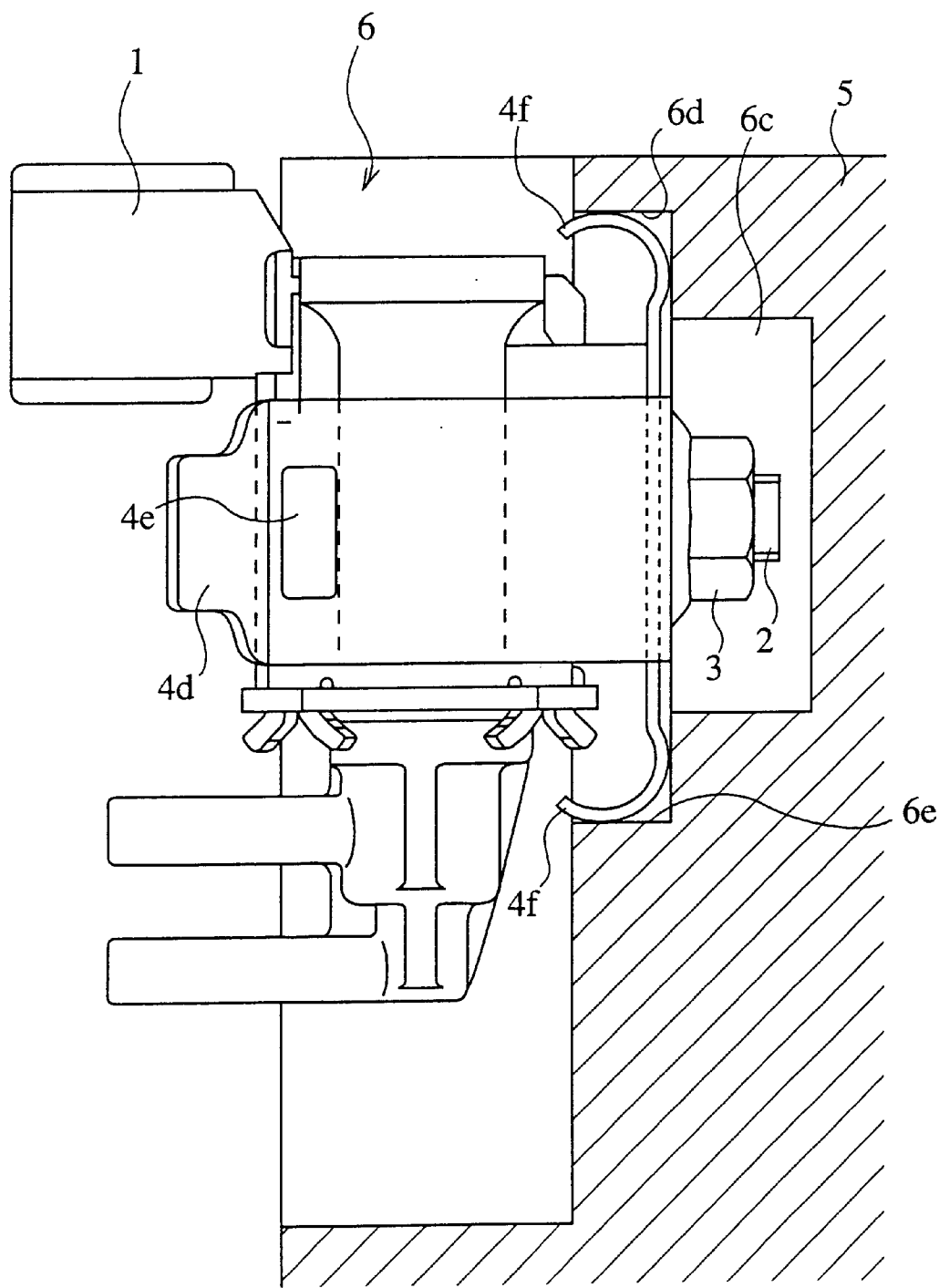
FIG. 9 is a side cross sectional view of a solenoid valve fixing structure.
Figure 10:
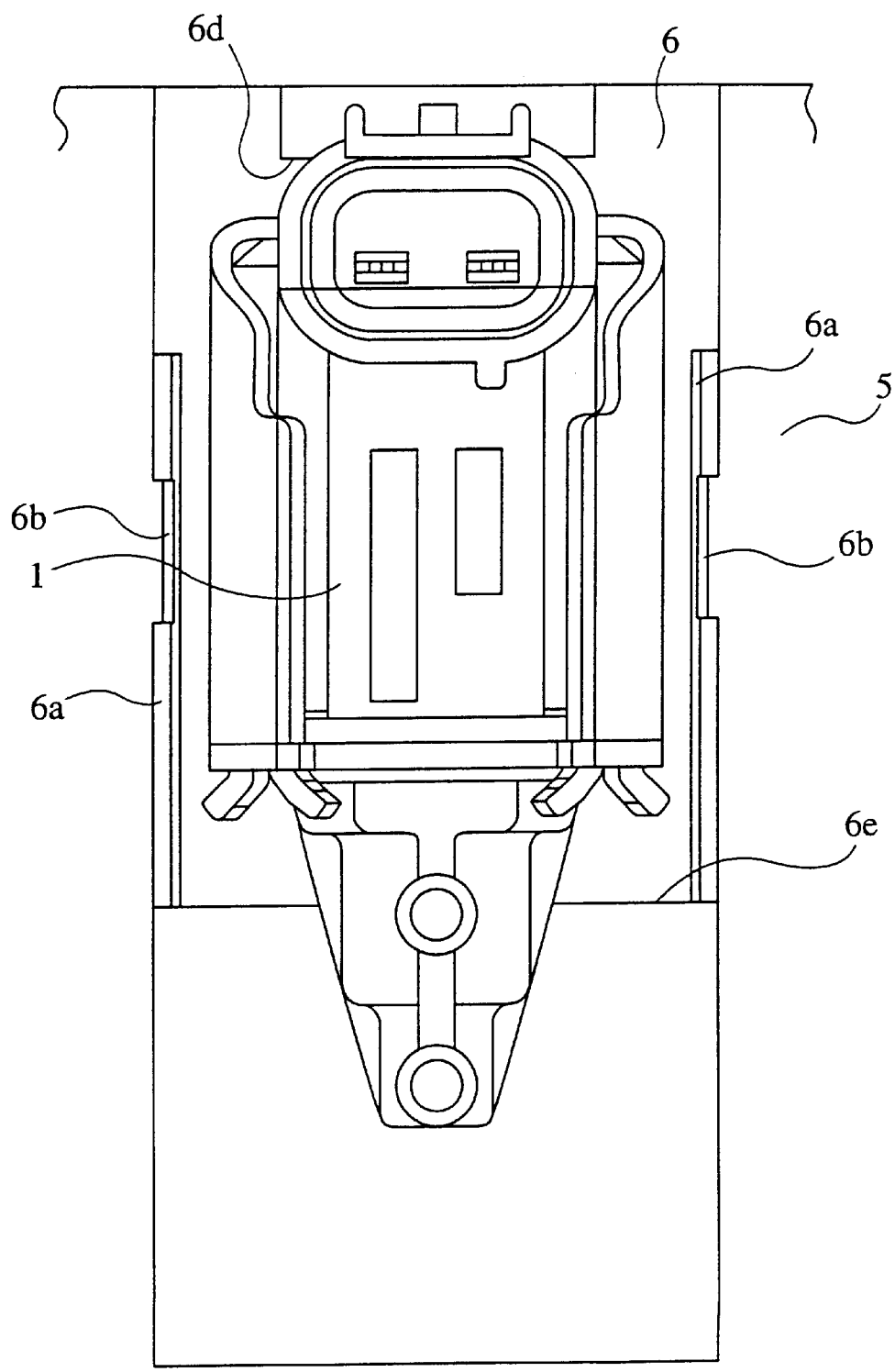
FIG. 10 is a front view showing a fixing position of the solenoid valve.

In FIGS. 1, 9 and 10, reference numeral 1 denotes a solenoid valve, 2 is a bolt as a fixing means, 3 is a nut as a fixing means, 4 is a fixing member for fixing the solenoid valve 1 to a manifold, which is made form synthetic resin or metal (for example aluminum, iron). These elements are made from deformable synthetic resin (for example plastic resin) or deformable metal and are integrated to form one body. Reference numeral 6 denotes a recessing portion disposed in an intake manifold 5, and serves to receive a solenoid valve 1. The recessing portion can be formed by molding, when the intake manifold is made from synthetic resin.

The structure of the fixing member 4 is more precisely explained below.

Figure 2:
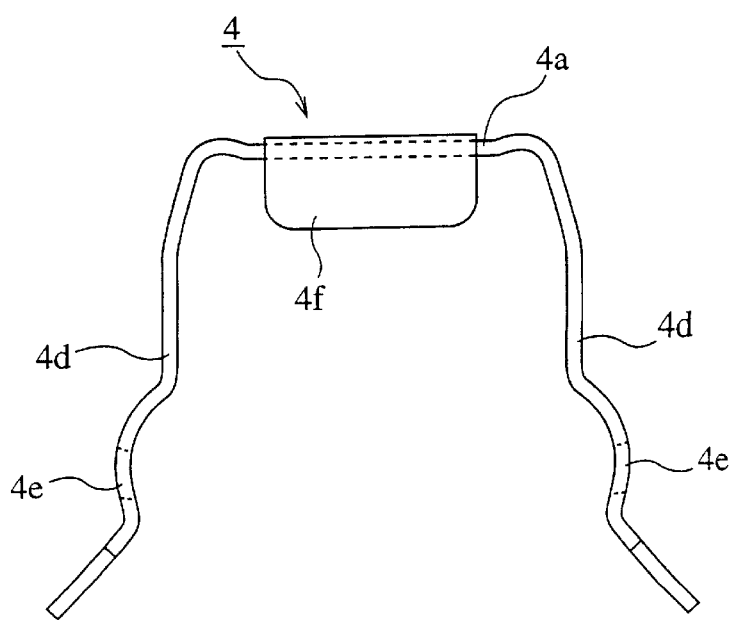
FIG. 2 is a front view of a fixing member in the solenoid valve fixing structure of FIG. 1.
Figure 3:
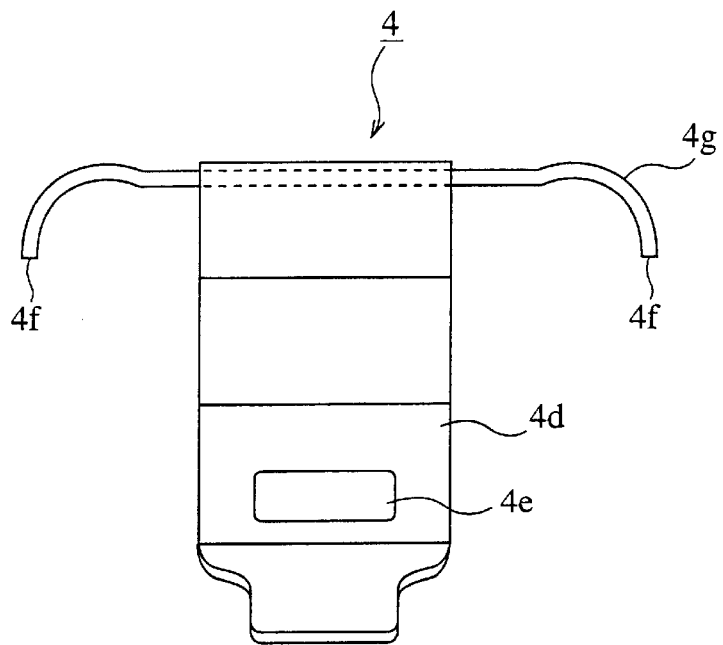
FIG. 3 is a side view of a fixing member in the solenoid valve fixing structure of FIG. 1.
Figure 4:
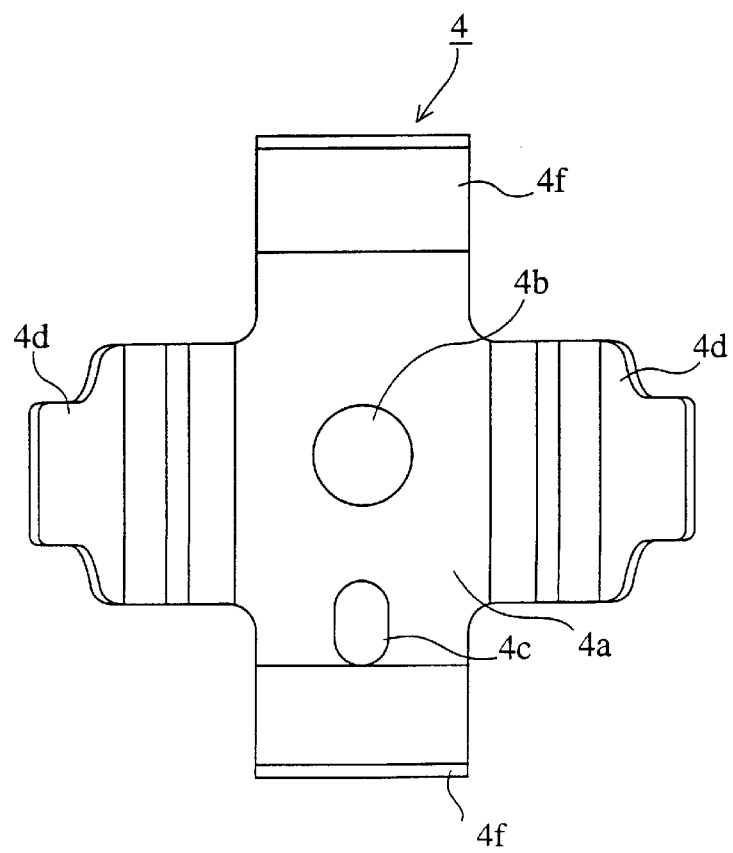
FIG. 4 is a plan view of a fixing member in the solenoid valve fixing structure of FIG. 1.
Figure 5:
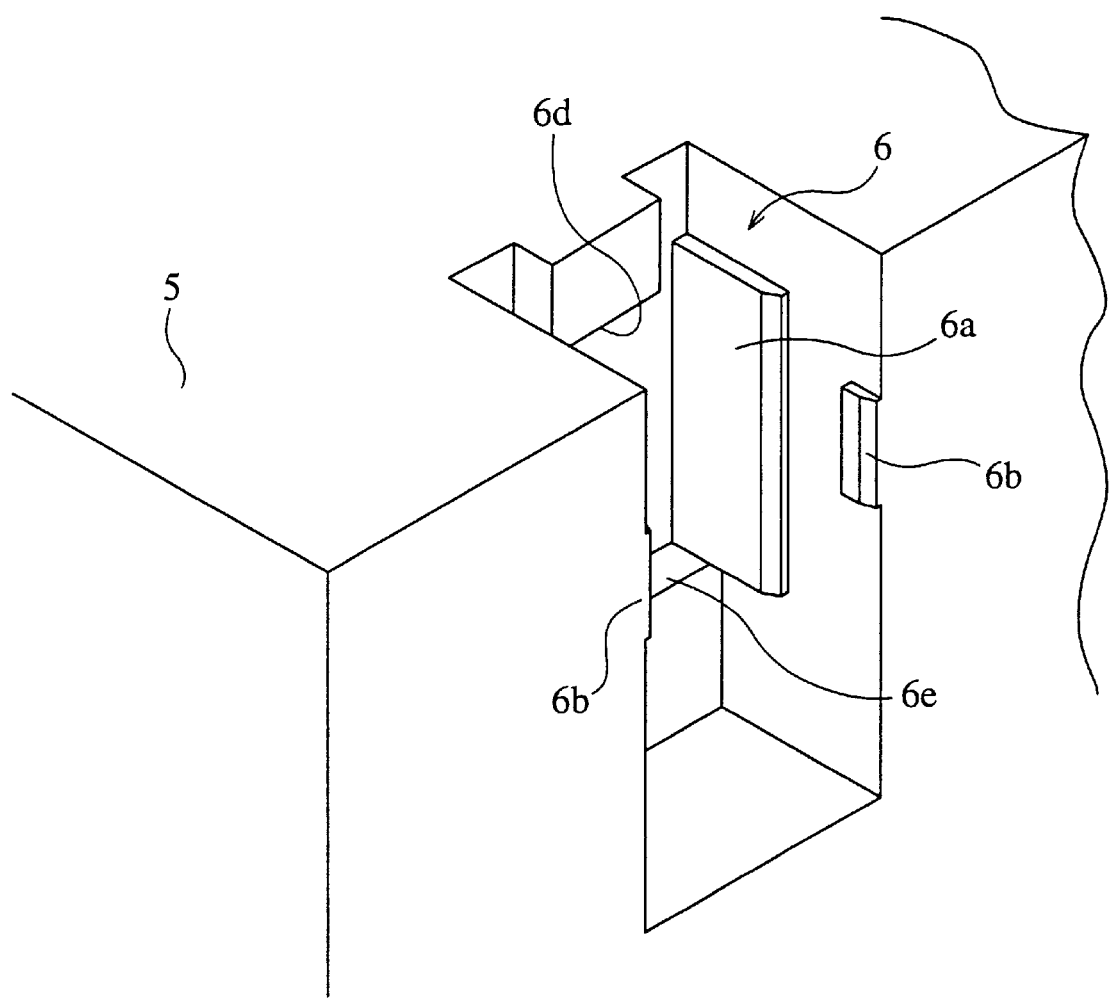
FIG. 5 is a perspective view of the recessing portion.
Figure 6:
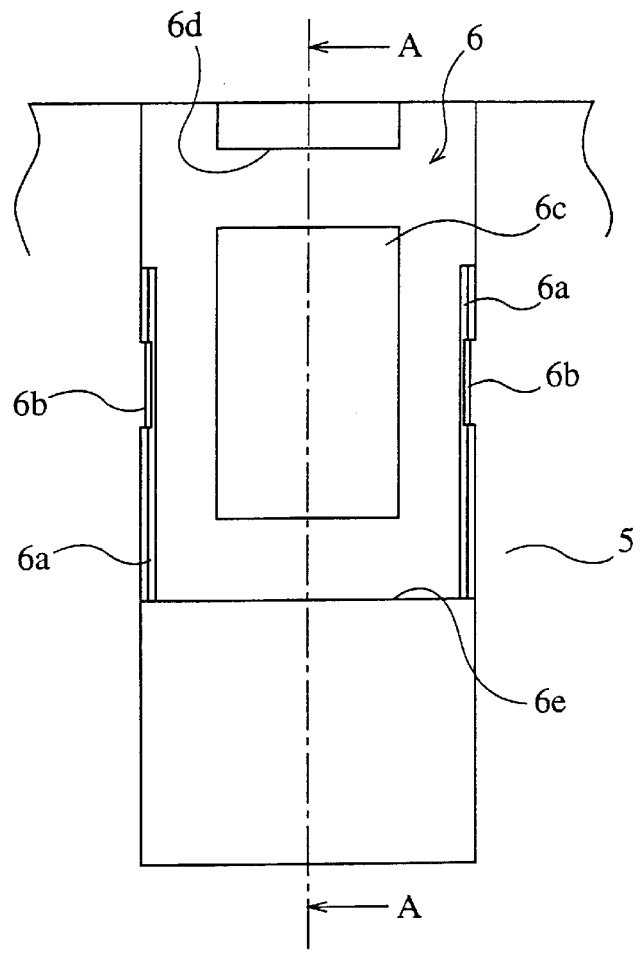
FIG. 6 is a front view of the recessing portion.
Figure 7:
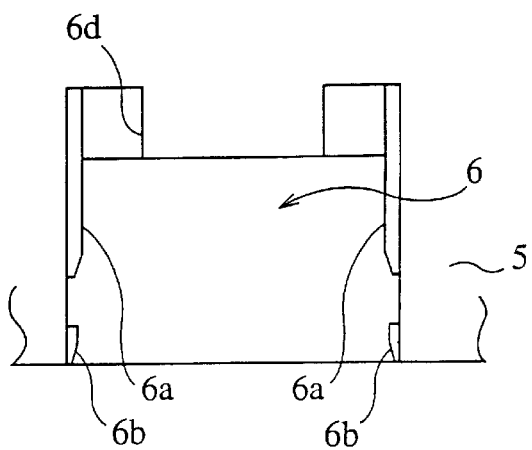
FIG. 7 is a plan view of the recessing portion.
Figure 8:
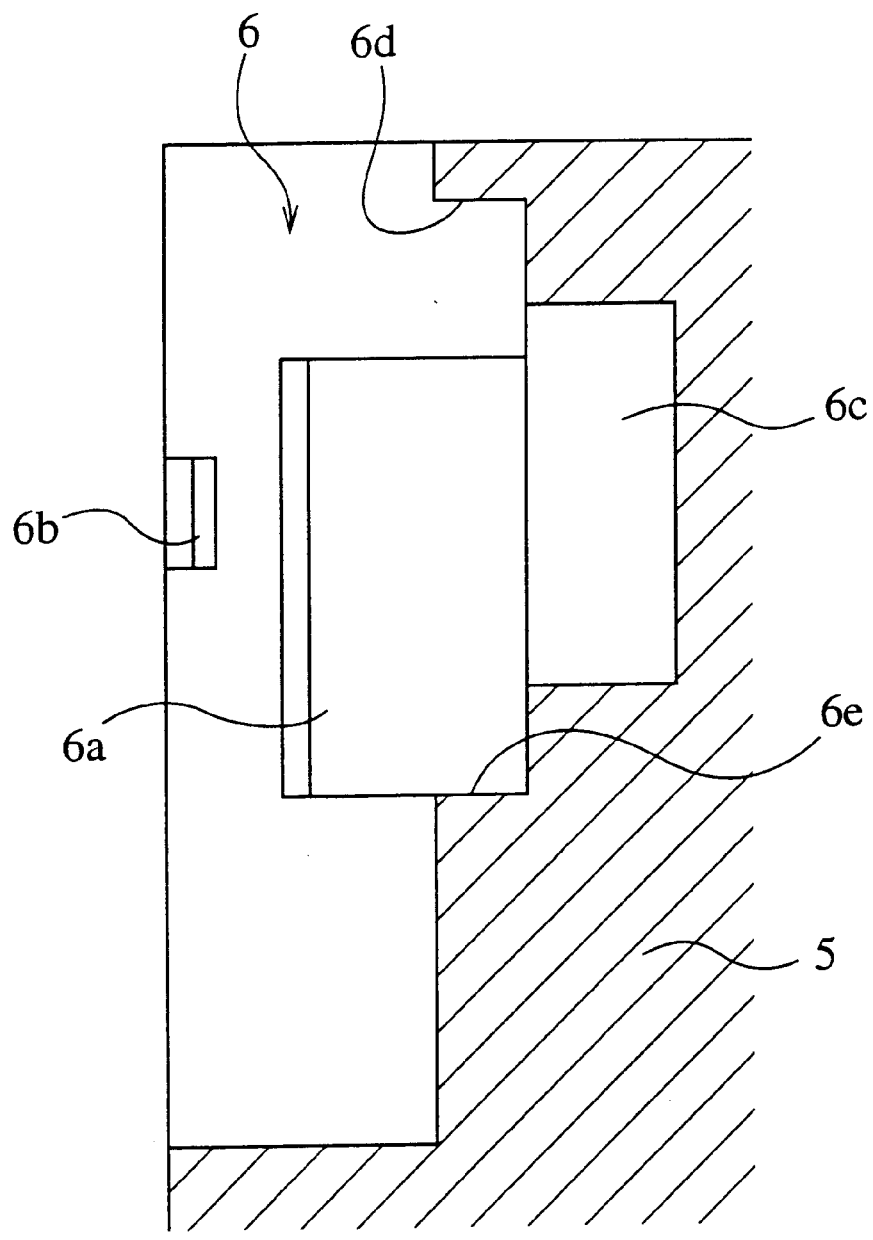
FIG. 8 is an A—A cross sectional view of FIG. 6.

Referring to FIGS. 2–4, a fixing part 4a is a portion to be fixed with a solenoid valve 1, 4b is a bolt hole for a bolt 2, 4c is a through hole, 4d is a pair of deformable lips elongated form the fixing member 4a for defining the lateral position of the solenoid valve 1 in the recessing portion 6. The deformable lips 4d are bent or folded so as to be deformable.

Reference numeral 4e is an engaging hole, with which an engaging claw 6b engages, which will be explained later. A pair of insertion lips 4f elongates from the fixing part 4a. The insertion lips 4f are to be inserted between shoulder portions 6d and 6e, so as to define the vertical position of a solenoid valve 1 in the recessing portion 6. Reference numeral 4g denotes a rounded portion for smooth insertion of the insertion lip 4f into the space between the shoulder portions 6d and 6e.

The structure of the recessing portion 6 is explained below. As shown in FIGS. 5–8, a pair of shoulders 6a are arranged on the right and left wall of the recessing portion 6, which are designed so as to contact with the deformable lips 4d. A pair of engaging claws 6b projects from the right and left wall of the recessing portion 6. The claws 6b are designed so as to engage with the engaging hole 4e disposed in the deformable lips 4d. A bolt clearance space 6c is disposed in the recessing portion 6 at a position corresponding to the bolt 2 so as to make a clearance space between the bolt 2 and the recessing portion 6. A shoulder portion 6d is disposed at a position over the bolt clearance space 6c. The shoulder portion is designed so as to contact with the upper insertion lip 4f. Another shoulder portion 6e is disposed at a position under the bolt clearance space 6c. The shoulder portion 6c is designed so as to contact with the lower insertion lip 4f.

Figure 11:
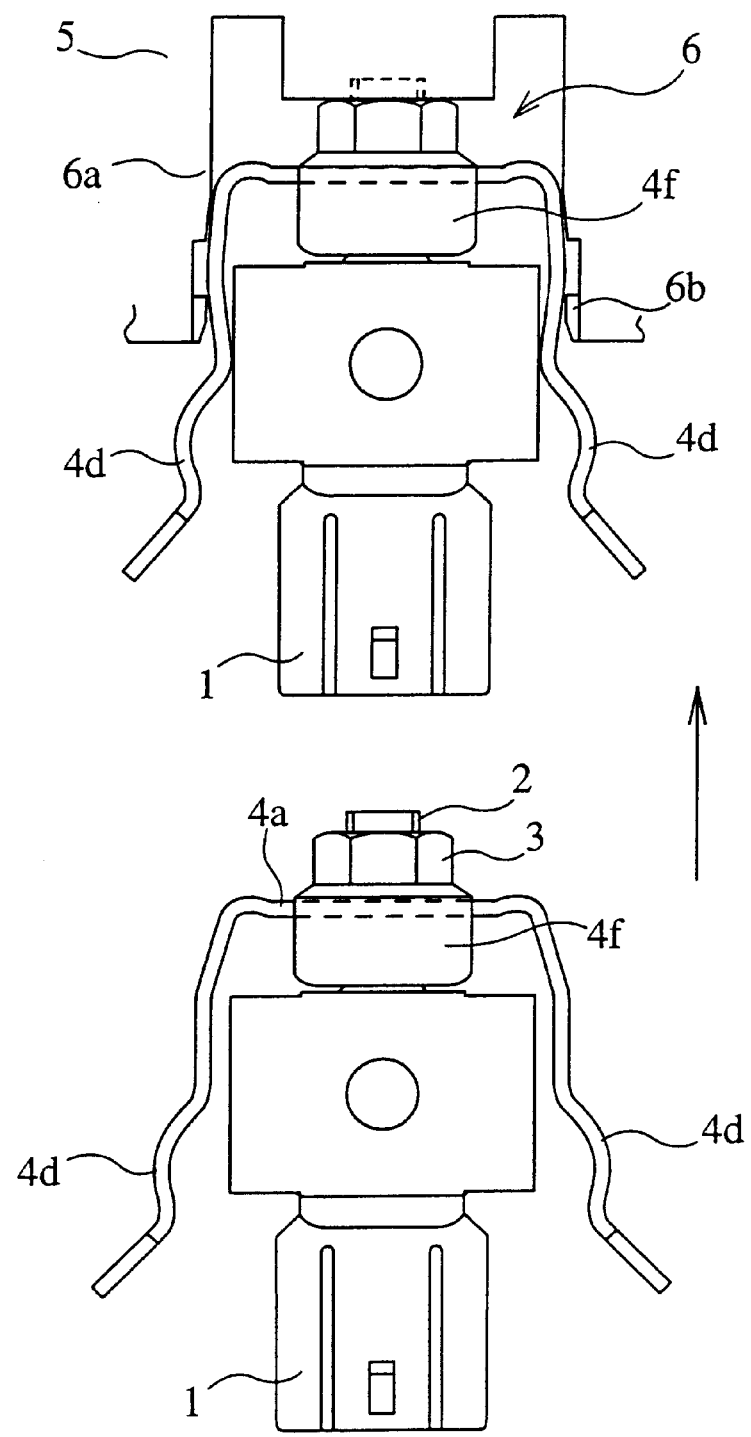
FIG. 11 is a plan views showing how a solenoid valve is fixed to an intake manifold.
Figure 12:
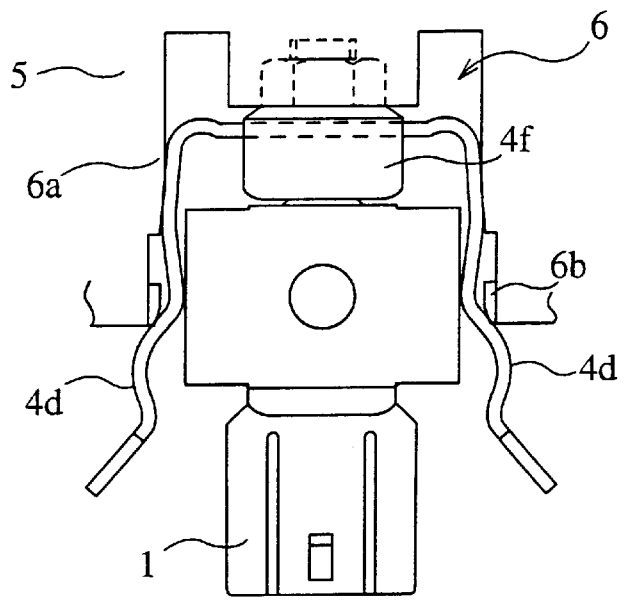
FIG. 12 is a plan views showing how a solenoid valve is fixed to an intake manifold.
Figure 13:
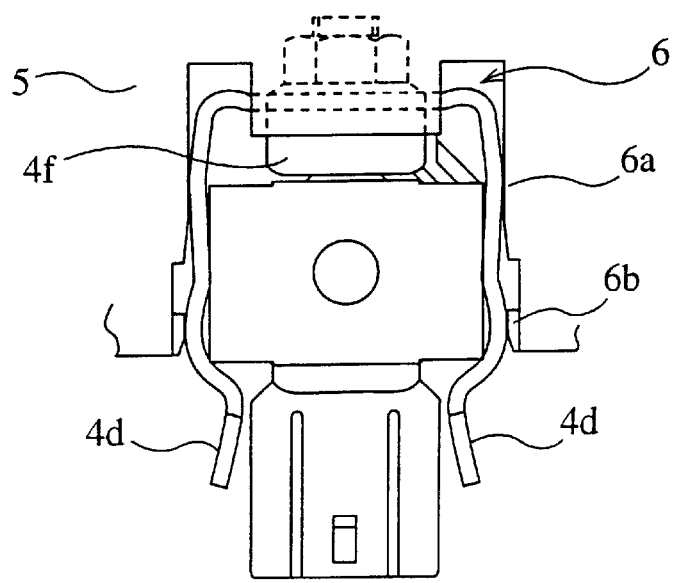
FIG. 13 is a plan views showing how a solenoid valve is fixed to an intake manifold.

The function of the solenoid valve fixing structure of this embodiment is explained below: At first, a solenoid valve 1 shall be fixed to the fixing member 4, by mounting a bolt 2 to a solenoid valve 1; The bolt 2 is inserted through the bolt hole 4b; And is tightened by a nut 3. The solenoid valve 1 is fixed following the steps as shown in FIGS. 11–13. Namely, the solenoid valve is inserted into the recessing portion 6, pinching by fingers the deformable lips 4d, 4d toward the solenoid valve. Then the deformable lips 4d contacts with the shoulder 6a and the insertion lips 4f are received between the shoulders 6d, 6e, as shown in FIG. 9.

Figure 14:
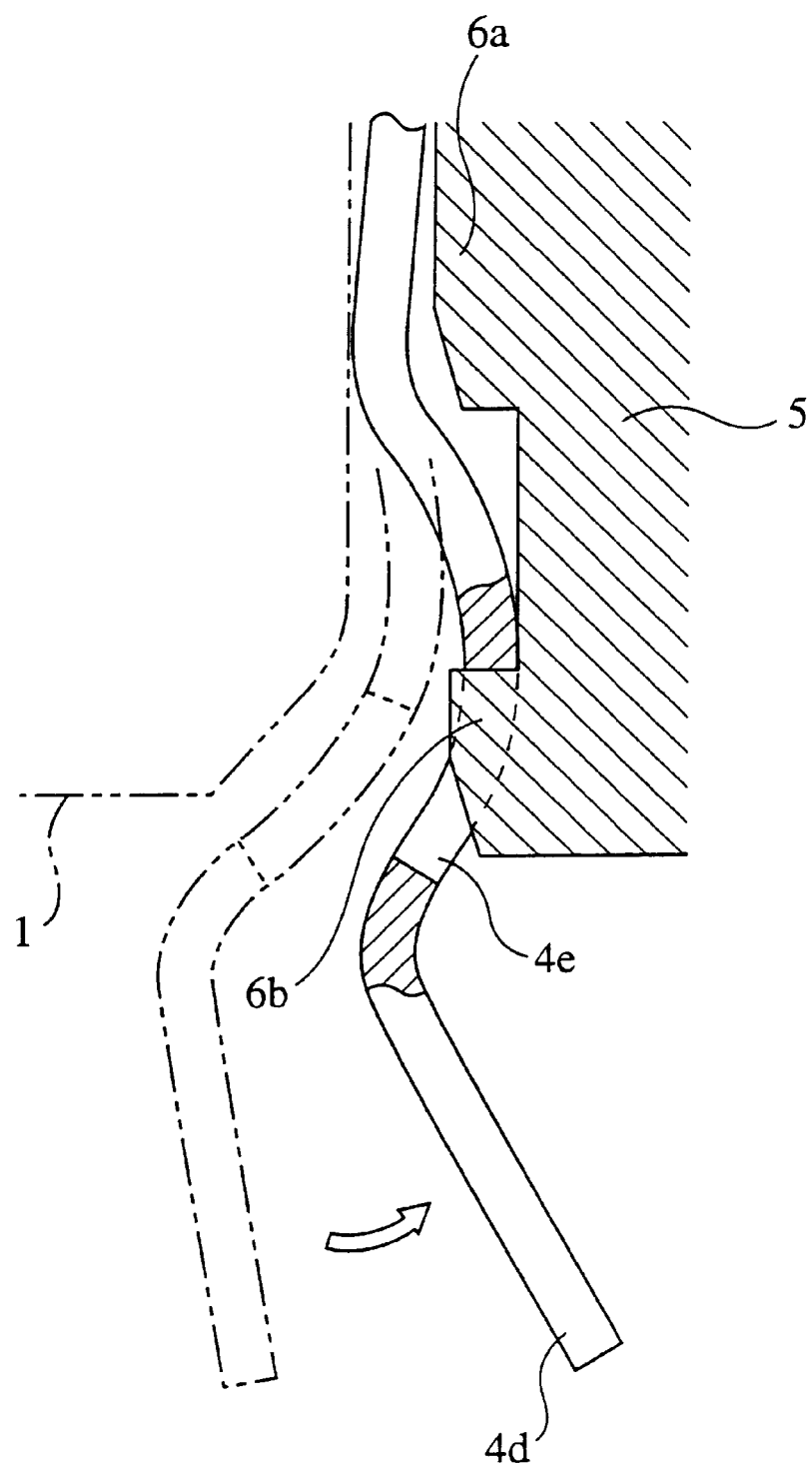
FIG. 14 is a detailed cross sectional view showing the engagement of the engaging hole and the engaging claw.

Releasing the deformable lips 4d, 4d from the fingers, as shown in FIG. 14, the deformable lips 4d, 4d opens to separate from the solenoid valve by its resilient force so that the engaging hole 4e engages with the shoulder 6a. As a result, the position of the solenoid valve 1 in the lateral direction is determined by this contact of the deformable lips 4d and the shoulder 6a. And, as shown in FIG. 9, the vertical position is determined by the contact of the insertion lips 4f and the shoulders 6d, 6e.

In this manner as explained, the solenoid valve 1 can be fixed in the recessing portion 6 strongly and promptly. In aforementioned embodiment, the deformable lips are pinched by fingers during the insertion of the solenoid valve. However, it is possible to designed a solenoid valve fixing structure, in which a solenoid valve is pushed in without pinching the deformable lips. In such a case, the deformable lips 4d can be inserted into the recessing portion, by pushing in the solenoid valve, and profiting the elastic deformation of the deformable lips 4d.

When the solenoid valve 1 is fixed, the bolt 2 and the nut 3 are received in the bolt clearance space 6c, and also the main body of the solenoid valve 1 is received in the recessing portion 6. This means that the solenoid valve can be fixed to a manifold compactly. The compactness of the fixing is improved remarkably compared with the prior art.

By the way, the solenoid valve 1 can be easily and promptly removed from the recessing portion 6 by pinching with fingers the deformable lips 4d, 4d towards the solenoid valve 1 and pulling it out.

As precisely explained above, this embodiment has an advantage that a solenoid valve 1 can be fixed easily and compactly to an intake manifold 5, by using a fixing member 4, which can be fabricated easily and cheaply, there is no need to redesign the external form of the solenoid valve 1, thus the total cost for fixing the solenoid valve is cheap.

Figure 15:
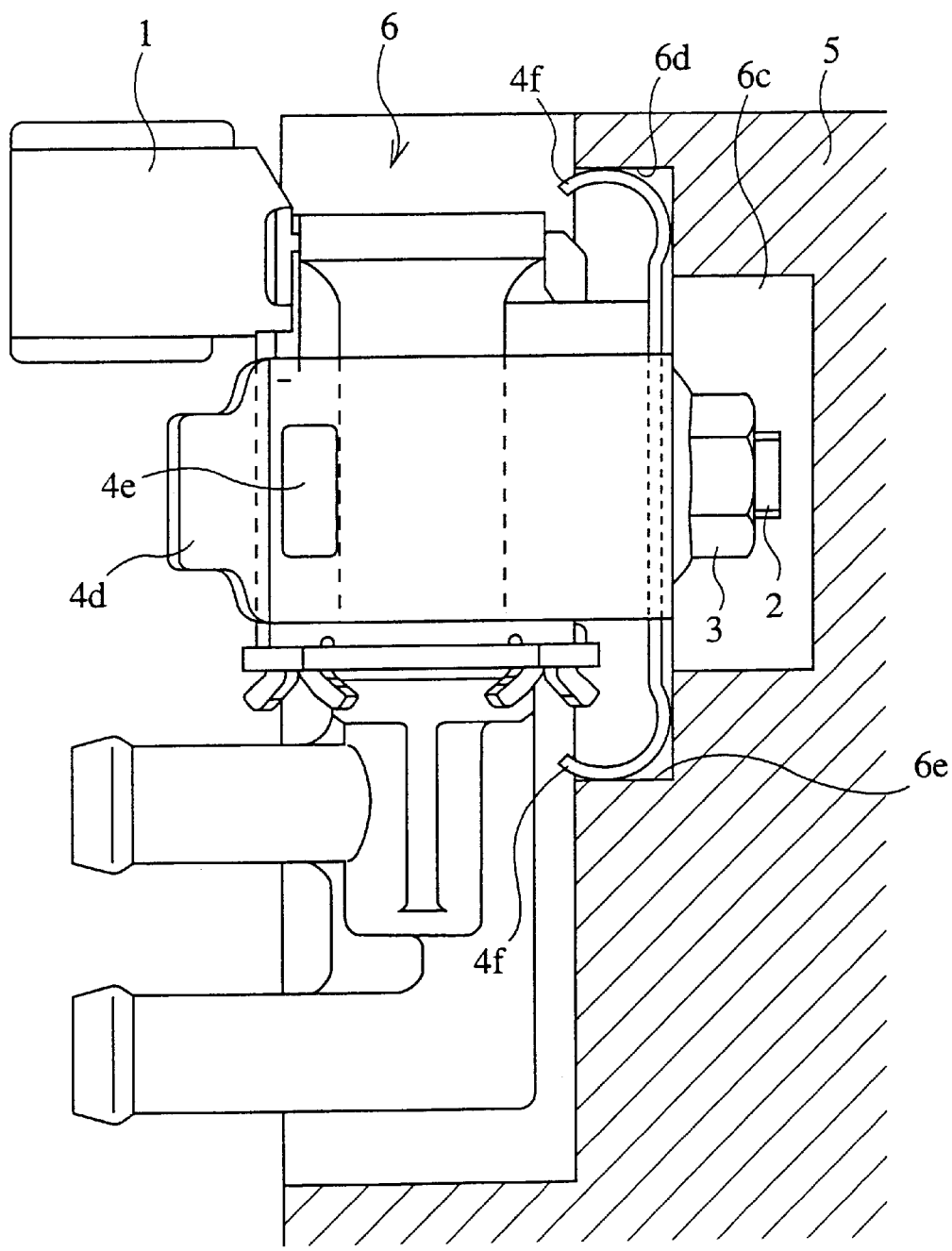
FIG. 15 is a side cross sectional view showing the fixed state of a large sized solenoid valve.

The recessing portion 6 can have a larger vertical size which allows to receive a larger sized solenoid valve. In such a case, when a larger sized solenoid valve would be required to be installed in the future, such a solenoid valve 1 could be easily installed and fixed accordingly. FIG. 15 shows a lateral cross sectional view of the recessing portion, when such a larger sized solenoid valve is installed therein.

A solenoid valve fixing structure according to the first embodiment is explained, on the basis of the forms of the fixing member 4 and the recessing portion 6 as shown in the figures. However a solenoid valve fixing structure comprising a fixing member and a recessing portion, which have similar effects as aforementioned embodiment, belongs to the scope of the present invention.

Embodiment 2

Figure 16:
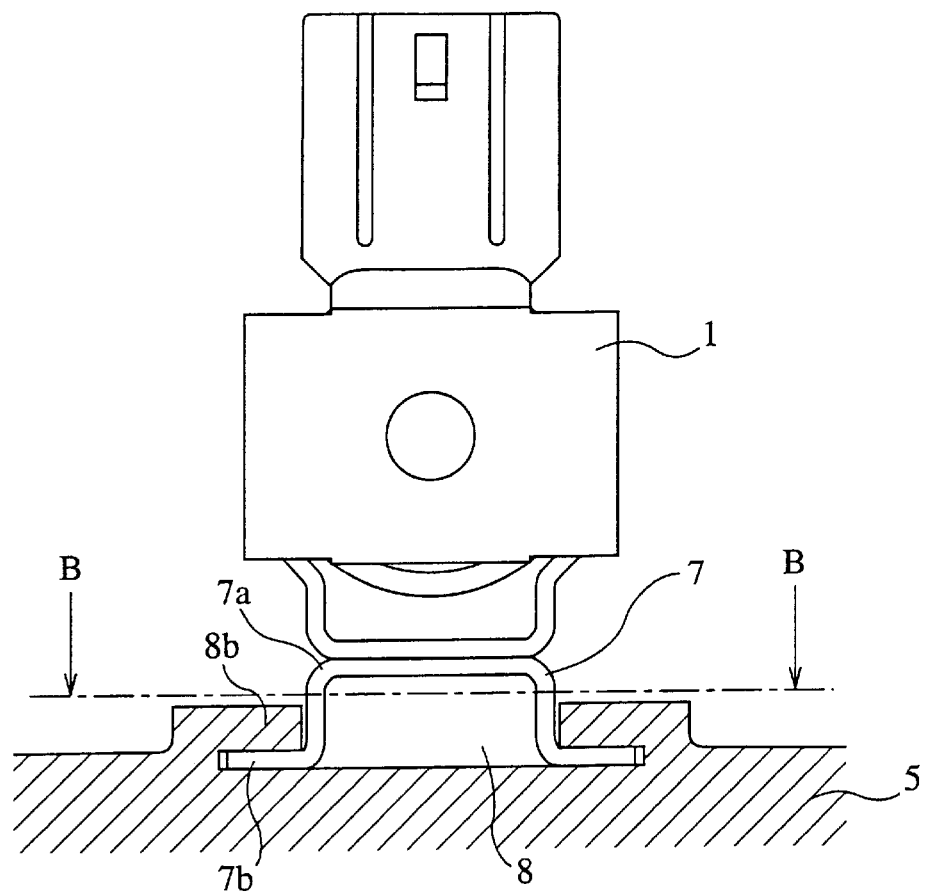
FIG. 16 is a solenoid valve fixing structure according to the second embodiment of the present invention.
Figure 17:
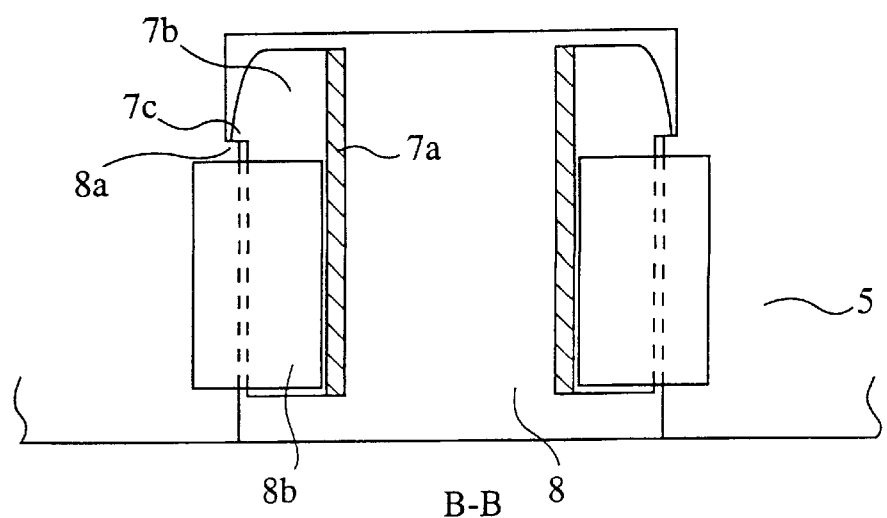
FIG. 17 is a B—B cross sectional view of FIG. 16.

FIG. 16 shows a plan view of a solenoid valve fixing structure according to the second embodiment of the present invention, FIG. 17 is a B—B cross-sectional view of FIG. 16. In the following explanation, elements already explained in the first embodiment are referred by the same reference numeral as in the explanation of the first embodiment. And their explanation is not repeated.

In FIGS. 16, 17, reference numeral 7 denotes a fixing member, which is made from metal or synthetic resin, to be fixed to a solenoid valve 1. The fixing member 7 comprises a fixing part 7a, which has a substantially U form cross section. The fixing part 7a is a portion to be fixed to a solenoid valve. The fixing member further comprises an insertion lip 7b, which elongates from the fixing part 7a and to be held between a recessing portion 8 and a holding lip 8b, which are explained later. An engaging claw 7c juts from the insertion lip 7b. The fixing part 7a, the insertion lip 7b and the engaging claw 7c are integrated to form a fixing member 7.

Reference numeral 8 denotes a recessing portion disposed in an intake manifold 5. A shoulder portion 8a is disposed in the recessing portion 8 so as to engage with the engaging claw 7c. A pair of holding lips 8b is disposed over the recessing portion. The holding lips 8b and the recessing portion 8 hold the insertion lip 7b between them. The fixing part 7a and the solenoid valve 1 are fixed to each other by means of, for example, welding, screwing, or press fitting, etc.

The function of the solenoid valve fixing structure of the second embodiment is explained below.

The insertion lips 7b of the fixing member 7, which is fixed to a solenoid valve 1, are pushed in so as to slide between the recessing portion 8 and the holding lips 8b, until the engaging claw 7c engages with the shoulder portion 8a. In this manner, the fixing of a solenoid valve 1 to a intake manifold can be promptly completed.

As explained above, this embodiment has an advantage that a solenoid valve 1 can be fixed easily and compactly to an intake manifold 5, by using a fixing member 7, which can be fabricated easily and cheaply. There is no need to redesign the form of the solenoid valve 1, thus cost for the fixing of the solenoid valve is cheap.

Embodiment 3

Figure 18:
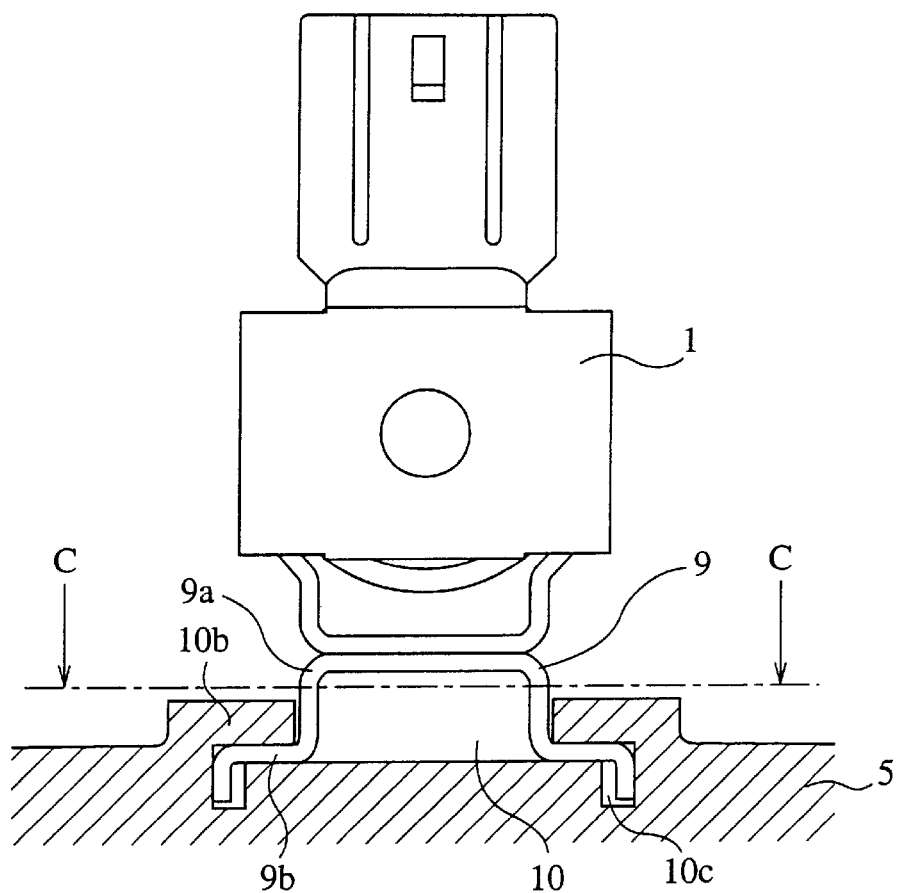
FIG. 18 is a solenoid valve fixing structure according to the third embodiment of the present invention.
Figure 19:
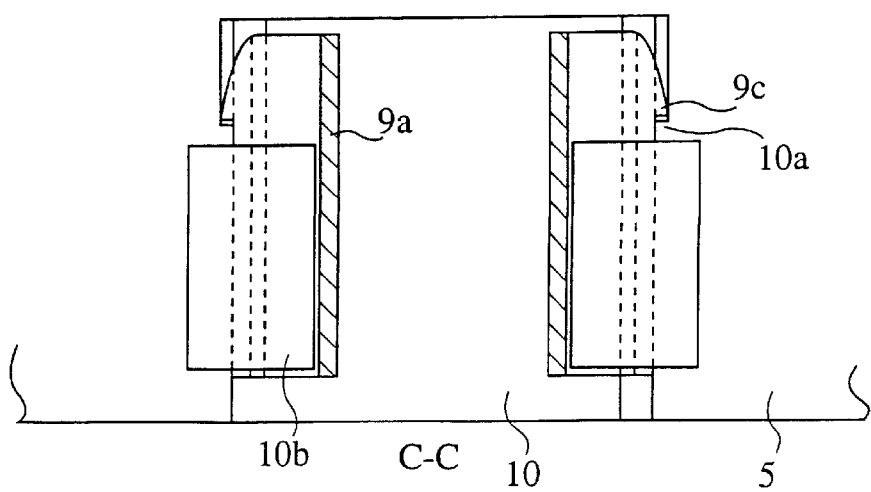
FIG. 19 is a C—C cross sectional view of FIG. 18.
Figure 20:
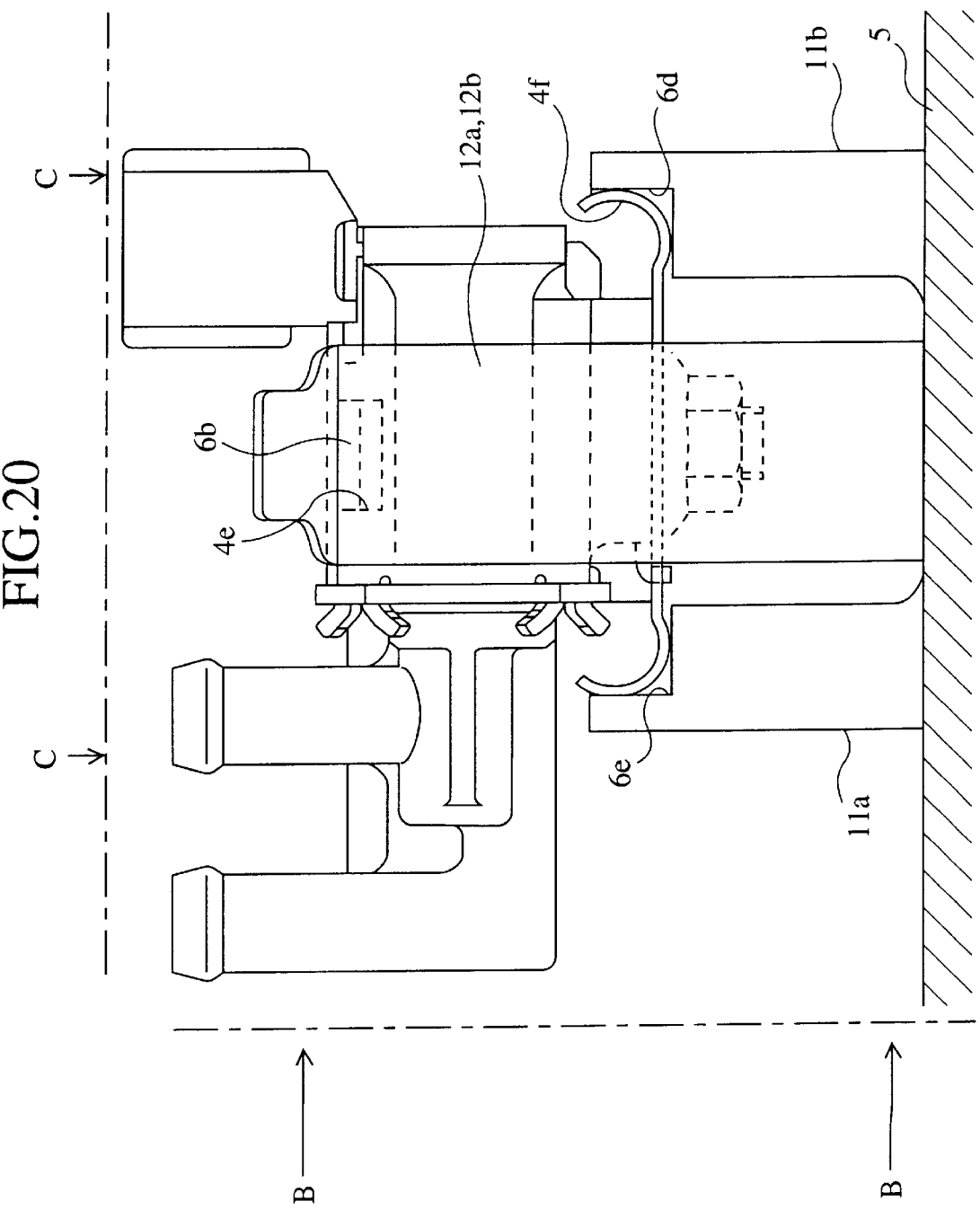
FIG. 20 is a front view of a solenoid valve fixing structure according to the fourth embodiment of the present invention.
Figure 21:
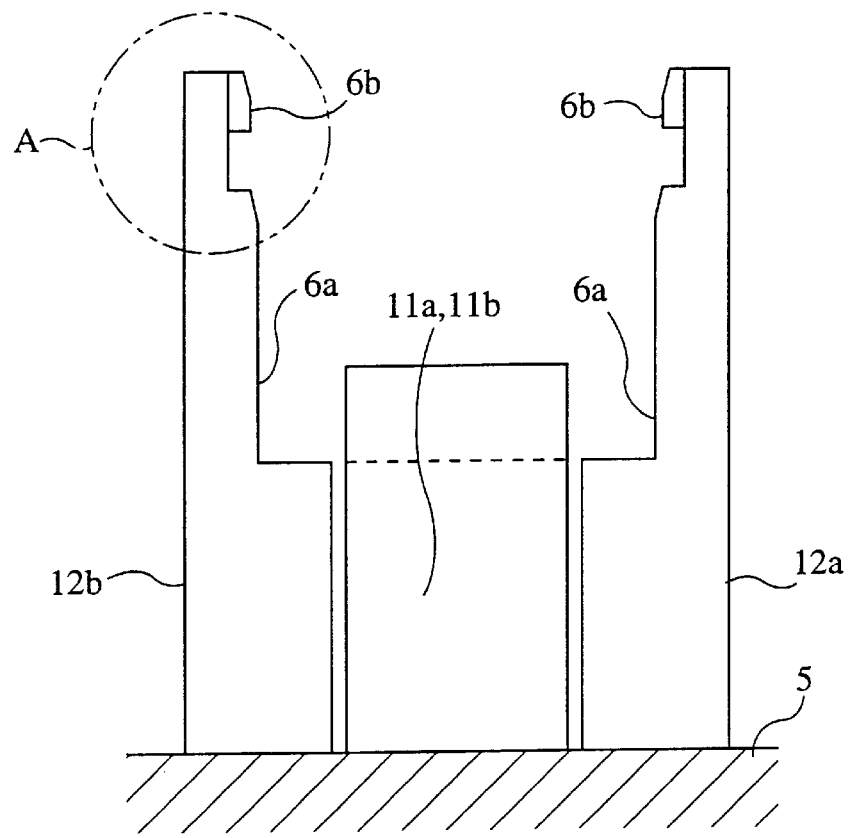
FIG. 21 is a side view of the receiving lip seen in the direction B in FIG. 20.
Figure 22:
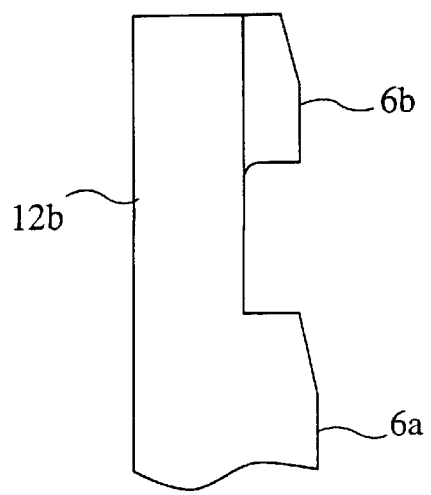
FIG. 22 is a detailed view of the part A in FIG. 21.
Figure 23:
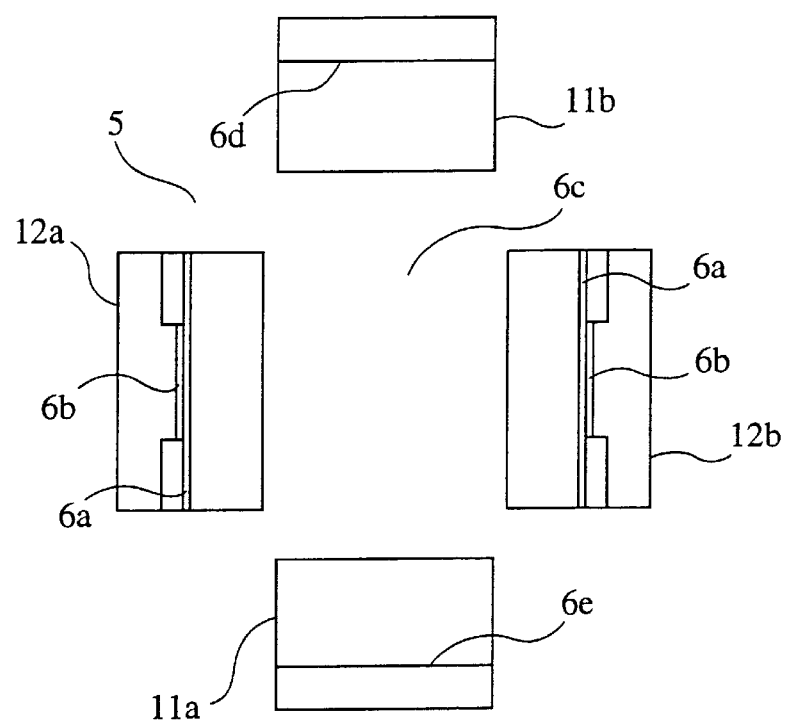
FIG. 23 is a plan view of the solenoid valve fixing structure seen in the direction C in FIG. 20.
Figure 24:
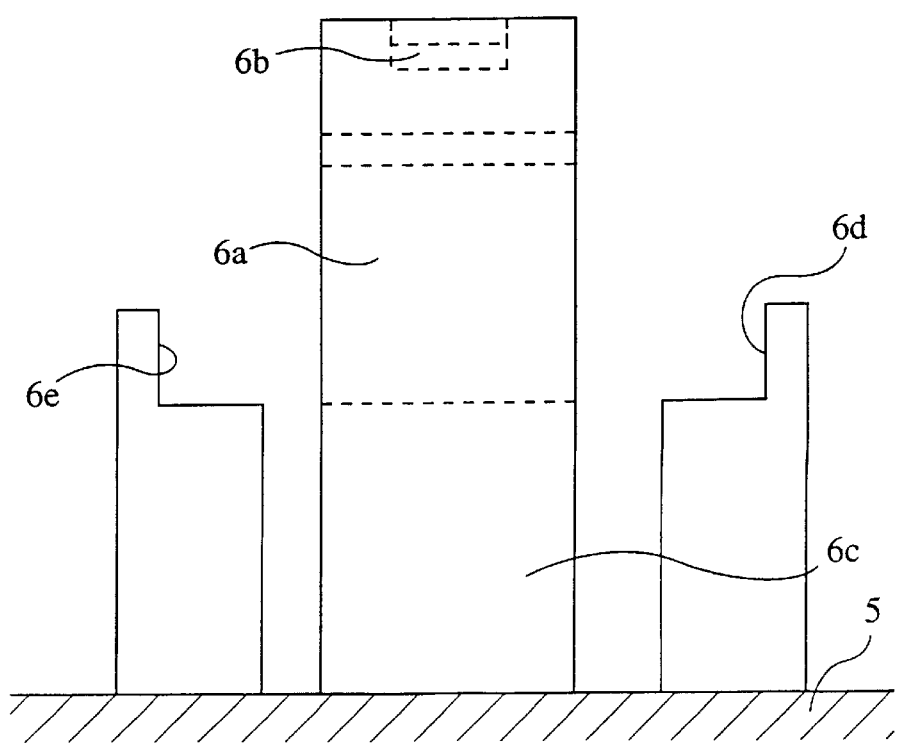
FIG. 24 shows only the receiving lips in FIG. 20. Other elements are omitted in this figure.
Figure 25:
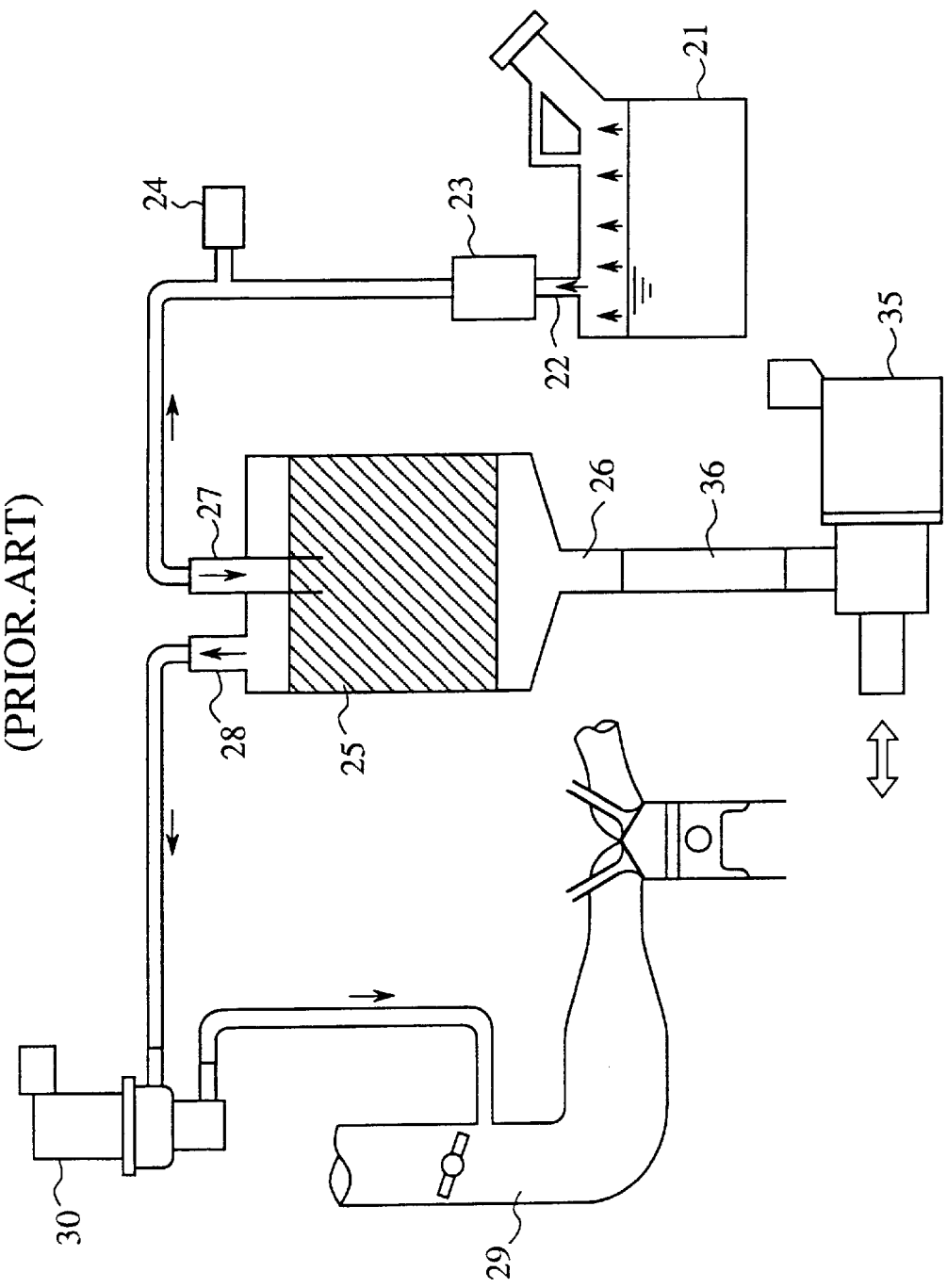
FIG. 25 is a schematic diagram of an apparatus for suppressing evaporated fuel gas emission in the prior art.
Figure 26:
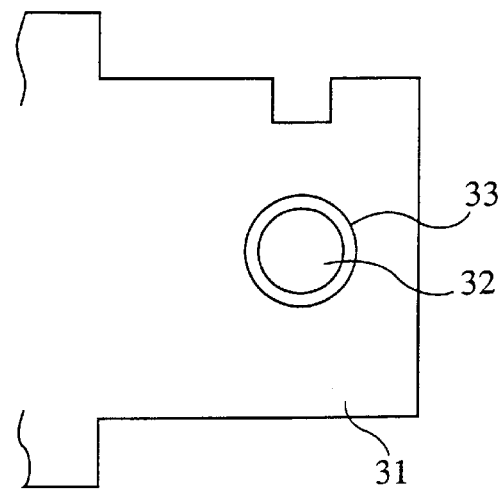
FIG. 26 is a fixing part disposed on the intake manifold in the prior art.
Figure 27:
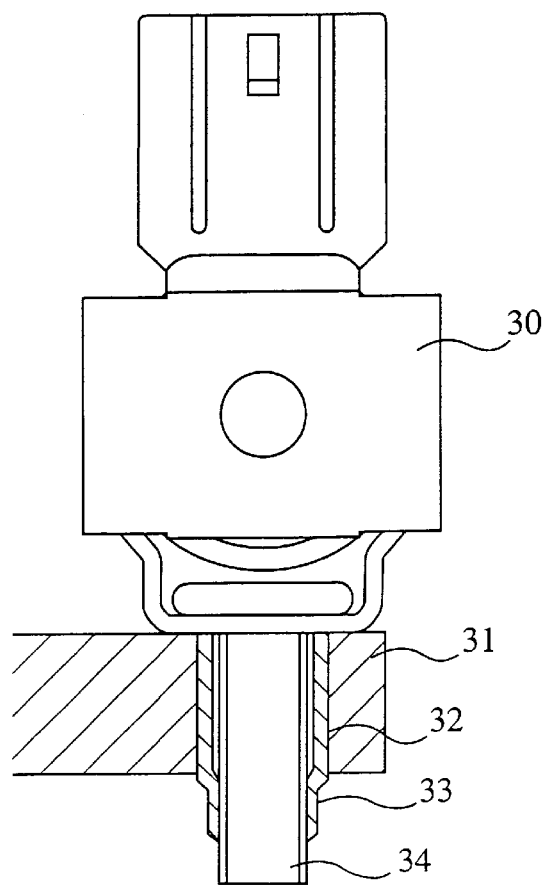
FIG. 27 is a partially cross sectional view of a solenoid valve fixing structure according to the prior art.

FIG. 18 shows a plan view of a solenoid valve fixing structure according to the third embodiment of the present invention. FIG. 19 shows a C—C cross-sectional view of FIG. 18.

In FIGS. 18 and 19, reference numeral 9 denotes a fixing member to be fixed to a solenoid valve 1. The fixing member 9 is made from metal or synthetic resin. The fixing member 9 comprises a fixing part 9a having a substantially U-formed cross section, an insertion lip 9b, which is an elongated portion of the fixing part 9a, and an engaging claw 9c jutting from the insertion lip 9b. The fixing portion 9a is a portion to be fixed to a solenoid valve 1. The insertion lip 9b has a substantially L-formed cross section so as to be held between a recessing portion 10 and a holding lip 10b, which are explained below. The fixing lip 9a, insertion lip 9b and engaging claw 9c are integrated to form a fixing member 9.

Reference numeral 10 denotes a recessing portion disposed on an intake manifold 5. Reference numeral 10a denotes a shoulder portion, which can engage with the engaging claw 9c. A holding lip 10b is disposed on the manifold 5 so that the insertion lip 9b can be held between the holding lip 10b and the recessing portion 10. A groove 10c guides the tip portion of the insertion lip 9b. The fixing part 9a and the solenoid valve 1 can be fixed to each other by welding, screwing, or press fitting, etc.

The function of the solenoid valve fixing structure according to the third embodiment is explained below.

After fixing a solenoid valve 1 to the fixing member, the insertion lips 9b of the fixing member 9 is pushed in so as to slide between the recessing portion 10 and the holding lips 10b, until the engaging claw 9c engages with the shoulder 10a. Then the fixing of a solenoid valve 1 to a intake manifold completes promptly. The insertion lip 9b is guided also by the groove 10c. Thus the position of the insertion lip 9b is defined by the groove 10c. Therefore the fixing of the solenoid valve is stable.

As explained, this embodiment has an advantage that a solenoid valve 1 can be fixed easily and compactly to an intake manifold 5, by using a fixing member 9, which can be fabricated easily and cheaply. There is no need to redesign the form of the solenoid valve 1, thus cost for the fixing of the solenoid valve is cheap.

Embodiment 4

The fourth embodiment is explained below, referring to FIGS. 20–24.

In this embodiment, the structure of the solenoid valve side is similar to that in the first embodiment, on the other hand, the intake manifold side is modified from that in the first embodiment. Therefore the explanation about the solenoid valve side is omitted here.

Four receiving elements 11a, 11b, 12a, 12b are projecting from an intake manifold. The receiving lips 11a, 11b receive the pair of deformable lips 4d, 4d. The receiving lips 12a, 12b receive the pair of deformable lips 4f, 4f. The receiving elements 11a, 11b have a shoulder portion 6d, 6d which can engage with the insertion lip 4f, 4f. The receiving lips 12a, 12b have an engaging claw 6b, 6b, which juts so as to engage with the engaging hole 4e, 4e disposed in the deformable lip 4d, 4d.

When the intake manifold is made by molding of synthetic resin, this structure facilitates the molding. But the compactness of the solenoid valve fixing deteriorates compared with the first embodiment, because the solenoid valve juts from the intake manifold.

In the first embodiment, in order to facilitate the piping work or wiring work, the inlet, the outlet and the connector from the solenoid valve are orientated in the longitudinal direction of the recessing portion. On the other hand, in this embodiment, it can be orientated lateral to the longitudinal direction of the recessing portion. Thus, connections with other piping and wiring are easy in this embodiment.

An advantage of the solenoid valve fixing structure according to the present invention is, as explained, that a solenoid valve can be fixed easily and compactly to an intake manifold, because the structure comprises a recessing portion and a fixing member having a fixing lip, a deformable lip and an insertion lip. There is no need to redesign the external form of the solenoid valve., Another advantage of the present invention is that a solenoid valve can be fixed promptly and strongly, by disposing a shoulder portion for defining the insertion position and the insertion lip into the recessing portion and another shoulder period for defining the contacting position of the deformable lip.

Another advantage of the present invention is that the solenoid valve can be surely fixed, because an engaging hold is disposed in the deformable lip, and an engaging claw is disposed in the recessing portion so that the deformable lip can engage with the engaging claw.

An advantage of the present invention is that a compact fixing of a solenoid valve can be attained, by disposing a bolt clearance space in the recessing portion, so that a fixing means for fixing the fixing part to a solenoid valve can be received therein.

Another advantage of the present invention is that a solenoid valve can be fixed easily and cheaply, by using a recessing portion having a shoulder portion, a holding lip and a fixing member having a fixing part, an insertion lip and an engaging lip. There is no need to redesign to change the external form of an existing solenoid valve.

What is claimed is:

1. A solenoid valve fixing structure comprising: a recessed portion (6) disposed on an intake manifold (5), for receiving a solenoid valve (1), and a fixing member (4) having a fixing part (4*a*) to be fixed to the solenoid valve, a deformable lip (4*d*), which contacts elastically with the recessed portion, and an insertion lip (4*f*), which is to be inserted into the recessed portion, wherein said deformable lip is constructed from a flexible material that is easily deformed by pinching with fingers to accommodate said recessed portion, and said solenoid valve is substantially received within said recessed portion and secured when said deformable lip elastically contacts at least one interior surface of said recessed portion after direct insertion and expansion thereof.

2. A solenoid valve fixing structure according to claim 1, wherein said deformable portion is an elongated portion of the fixing part.

3. A solenoid valve fixing structure according to claim 1, wherein said insertion lip is an elongated portion of the fixing part.

4. A solenoid valve fixing structure according to claim 1, wherein a shoulder portion for defining the insertion position of the insertion lip and a shoulder portion for defining the contacting position of the deformable lip are disposed in the recessing portion.

5. A solenoid valve fixing structure according to claim 1, wherein an engaging hole is disposed in the deformable lip, and an engaging claw, which can engage with the engaging hole, is disposed in the recessing portion.

6. A solenoid valve fixing structure according to claim 1, wherein a bolt clearance space, which receives fixing means, which serve to fix the solenoid valve to the fixing part, is disposed in the recessing portion.

7. A solenoid valve fixing structure according to claim 1, wherein the recessing portion is formed in receiving elements disposed on the intake manifold.

8. A solenoid valve fixing structure comprising: a recessed portion (8) disposed on an intake manifold (5) and having a shoulder portion (8*a*), a holding lip (8*b*) disposed on the intake manifold so as to abut on the recessed portion, and a fixing member (7) having a fixing part (7*a*) that is substantially U-shaped and fixed to said solenoid valve, an insertion lip (7*b*), which is an elongated portion from the fixing part and to be held between the recessed portion and the holding lip, and an engaging claw (7*c*) disposed at a side of the insertion lip to engage with the shoulder portion, wherein said solenoid valve is secured to said manifold when the insertion lip is pushed directly in said recessed portion and slid between said recessed portion and said holding lip until the engaging claw contacts at least one surface in an interior periphery of said recessed portion.

* * * * *